United States Patent
Cook et al.

(10) Patent No.: US 10,171,578 B1
(45) Date of Patent: Jan. 1, 2019

(54) TAPERED COAX LAUNCH STRUCTURE FOR A NEAR FIELD COMMUNICATION SYSTEM

(71) Applicant: Texas Instruments Incorporated, Dallas, TX (US)

(72) Inventors: Benjamin Stassen Cook, Addison, TX (US); Nathan Brooks, Champaign, IL (US); Swaminathan Sankaran, Allen, TX (US); Bradley Allen Kramer, Plano, TX (US); Mark W. Morgan, Allen, TX (US); Baher Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/638,146

(22) Filed: Jun. 29, 2017

(51) Int. Cl.
*H04B 5/00* (2006.01)
*H04L 29/08* (2006.01)
*H04B 5/02* (2006.01)

(52) U.S. Cl.
CPC ....... *H04L 67/1063* (2013.01); *H04B 5/0031* (2013.01); *H04B 5/0062* (2013.01); *H04B 5/0068* (2013.01); *H04B 5/02* (2013.01)

(58) Field of Classification Search
CPC . H04L 67/1063; H04B 5/0031; H04B 5/0062; H04B 5/0068; H04B 5/02
USPC ........................................................ 455/41.1
See application file for complete search history.

(56) References Cited

U.S. PATENT DOCUMENTS

| | | | |
|---|---|---|---|
| 9,590,699 B1 | 3/2017 | Sankaran | |
| 2008/0153416 A1* | 6/2008 | Washiro | H04B 5/00 455/41.1 |
| 2014/0285281 A1* | 9/2014 | Herbsommer | H01P 3/16 333/26 |

OTHER PUBLICATIONS

Hongqiang Li et al, "Multi-brand Artificial Magnetic Surface and Its Applications in Antenna Substrate", 2004 4th International Conference on Microwave and Millimeter Wave Technology Proceedings, Aug. 18-21, 2004, Beijing, China, pp. 483-486.
J. R. Sohn et al, "Comparative Study on Various Artificial Magnetic Conductors for Low-Profile Antenna", Progress in Electromagnetics Research, PIER 61, 2006, pp. 27-37.
"Metamaterial", Wikipedia, pp. 1-15, available at https://en.wikipedia.org/wiki/Metamaterial on Dec. 4, 2015.
"Programmable Logic Controller", Wikipedia, pp. 1-10, available at https://en.wikipedia.org/wiki/Programmable_logic_controller on Dec. 2, 2015.
Nathan Brooks et al, "Integrated Artificial Magnetic Launch Surface for Near Field Communication System", U.S. Appl. No. 15/638,163, filed Jun. 29, 2017, pp. 1-44.

(Continued)

*Primary Examiner* — Sanh D Phu
(74) *Attorney, Agent, or Firm* — Michael A. Davis, Jr.; Charles A. Brill; Frank D. Cimino

(57) ABSTRACT

A system is provided in which a set of modules each have a substrate on which is mounted a radio frequency (RF) transmitter and/or an RF receiver. Each module has a housing that surrounds and encloses the substrate. The housing has a port region on a surface of the housing. Each module has a tapered near field communication (NFC) field confiner located between the substrate and the port region on the housing configured to guide electromagnetic energy produced by the RF transmitter to the port region so that it can be emanated to a port region of an adjacent module.

27 Claims, 6 Drawing Sheets

(56) References Cited

OTHER PUBLICATIONS

Swaminathan Sankaran et al, "Staggered Back-to-Back Launch Topology with Diagonal Waveguides for Field Confined Near Field Communication System", U.S. Appl. No. 15/368,194, filed Jun. 29 2017.

Benjamin Stassen Cook et al, "Launch Topology for Field Confined Near Field Communication System", U.S. Appl. No. 15/638,212, filed Jun. 29, 2017, pp. 1-43.

"Tunable metamaterial"; www.Wikipedia.org, printed Mar. 9, 2018; 11 pages.

* cited by examiner

TAPERED COAX LAUNCH STRUCTURE FOR A NEAR FIELD COMMUNICATION SYSTEM

CROSS REFERENCE TO RELATED APPLICATIONS

This patent application is related to U.S. patent application Ser. No. 15/638,163 filed Jun. 29, 2017; U.S. patent application Ser. No. 15/638,194, filed Jun. 29, 2017; and U.S. patent application Ser. No. 15/638,212 filed Jun. 29, 2017. These three applications are incorporated by reference herein.

FIELD OF THE DISCLOSURE

This disclosure generally relates to the use of near field communication (NFC) in place of physical/ohmic contacts for communication among system modules.

BACKGROUND OF THE DISCLOSURE

Near Field Communication (NFC) is a wireless technology allowing two devices to communicate over a short distance of approximately 10 cm or less. Various protocols using NFC have been standardized internationally within NFC Forum specifications and defined in ISO/IEC 18092, ECMA-340, and ISO 14443, for example. NFC allows a mobile device to interact with a subscriber's immediate environment. With close-range contactless technology, mobile devices may be used as credit cards, to access public transportation, to access secured locations, and many more applications. Contactless systems are commonly used as access control ID's (e.g. employee badges), as well as payment systems for public transportation etc. More recently, credit cards are beginning to include NFC capability.

Typical NFC systems rely on low-frequency signals with structures such as coils or capacitive plates with large fringing electric or magnetic fields to facilitate signal transfer over a short distance. However, these low frequencies limit data rate. To increase data rate, the frequency of the carrier must be increased, and a large bandwidth around that carrier must be allocated.

Permittivity is a material property that expresses a measure of the energy storage per unit meter of a material due to electric polarization $(J/V^2)/(m)$. Relative permittivity is the factor by which the electric field between the charges is decreased or increased relative to vacuum. Permittivity is typically represented by the Greek letter E. Relative permittivity is also commonly known as dielectric constant.

Permeability is the measure of the ability of a material to support the formation of a magnetic field within itself in response to an applied magnetic field. Magnetic permeability is typically represented by the Greek letter p.

A dielectric is an electrical insulator that can be polarized by an applied electric field. When a dielectric is placed in an electric field, electric charges do not flow through the material as they do in a conductor, but only slightly shift from their average equilibrium positions causing dielectric polarization. Because of dielectric polarization, positive charges are displaced toward the field and negative charges shift in the opposite direction. This creates an internal electric field which reduces the overall field within the dielectric itself. If a dielectric is composed of weakly bonded molecules, those molecules not only become polarized, but also reorient so that their symmetry axis aligns to the field. While the term "insulator" implies low electrical conduction, "dielectric" is typically used to describe materials with a high polarizability, which is expressed by a number called the relative permittivity (er). The term insulator is generally used to indicate electrical obstruction while the term dielectric is used to indicate the energy storing capacity of the material by means of polarization.

BRIEF DESCRIPTION OF THE DRAWINGS

Particular embodiments in accordance with the disclosure will now be described, by way of example only, and with reference to the accompanying drawings.

Figure 1:
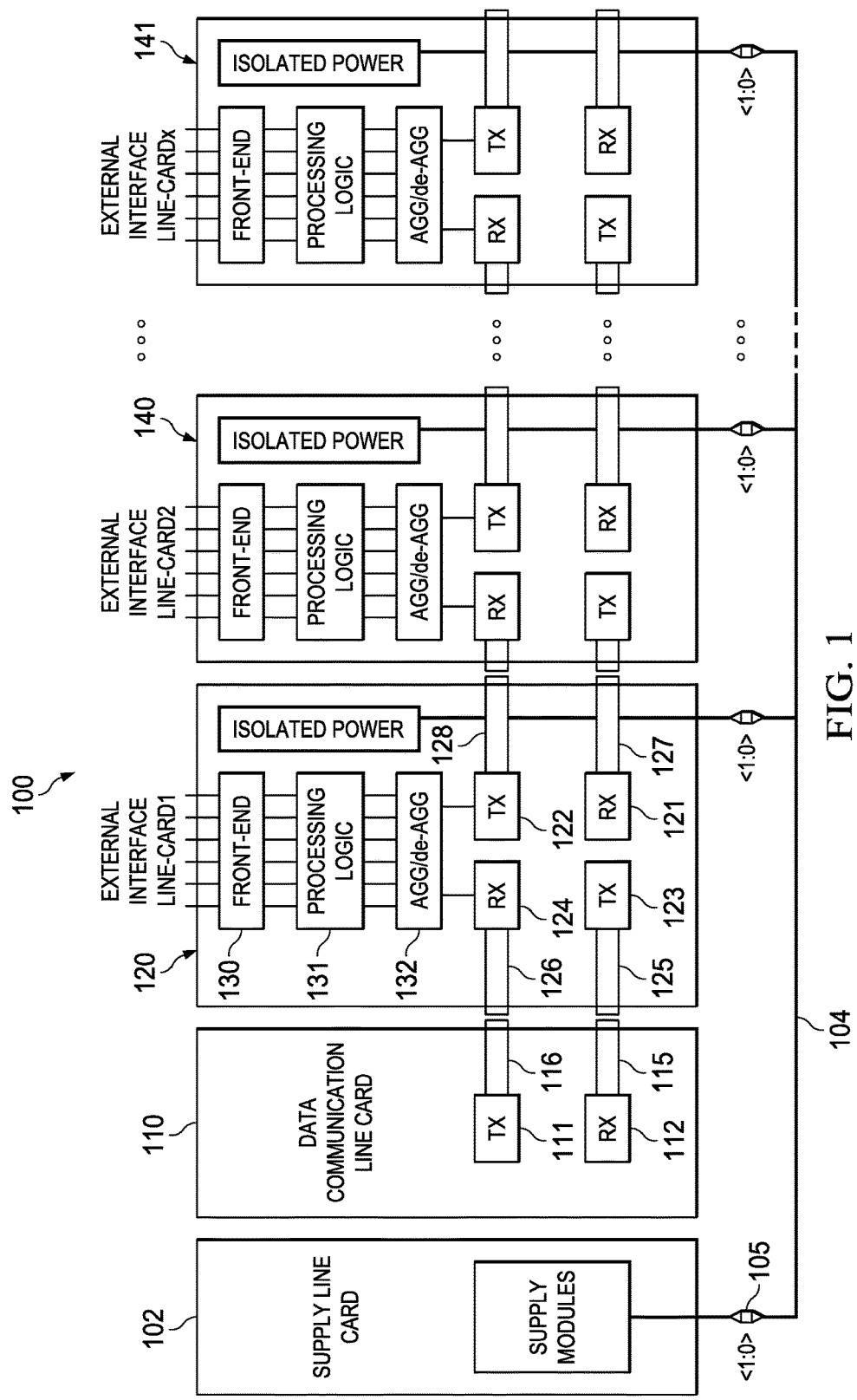
FIG. 1 is a block diagram of an exemplary system that uses guided NFC communication between modules.

Other features of the present embodiments will be apparent from the accompanying drawings and from the detailed description that follows.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

As mentioned above, Near Field Communication (NFC) is a short-range wireless connectivity technology that uses magnetic field induction to enable communication between devices when they are touched together, or brought within a few centimeters of each other. Several communication protocols using NFC have now been standardized, such as ISO/IEC 18092, ECMA-340, and ISO 14443, for example. The various standards specify a way for the devices to establish a peer-to-peer (P2P) network to exchange data.

Contactless systems are commonly used as access control ID's (e.g. employee badges), as well as payment systems for public transportation etc. More recently, credit cards are beginning to include NFC capability. However, waves in open space propagate in all directions, as spherical waves. In this way, the far field loses power proportionally to the square of the distance; that is, at a distance R from the source, the power is the source power divided by R squared. Such random wave propagation may also result in interference to other systems that are located nearby and be in violation of emission limits set by standard bodies such as FCC.

Typical near field communication (NFC) systems rely on low-frequency signals with structures like coils or capacitive plates with large fringing electric or magnetic fields to perform signal transfer over a short distance (several mm). However, these low frequencies limit data rate. To increase data rate, the frequency of the carrier must be increased, and a large bandwidth around that carrier must be allocated. Typical NFC techniques do not work well at high frequencies because inductive and capacitive communication works best when the distance and coil/capacitor size is much shorter than the wavelength. For example, 13.56 MHz has a wavelength of 22 meters, while 13.56 GHz has a wavelength of only 22 millimeters.

Embodiments of the present disclosure may increase the frequency and bandwidth of NFC systems by using a tapered coaxial field confinement block to confine the electromagnetic fields between the transmitter (TX) and receiver (Rx) to transmit and receive the fields over a large bandwidth. A conductive electric field reflector may be positioned on the back side of the tapered coax field confinement block to further increase the amount of NFC field energy that is transferred to a neighboring module.

A tapered coax NFC field confiner may be used to conduct a radio frequency (RF) signal to a particular area where an electromagnetic field produced by the RF signal may be emanated to produce near field communication with another module. A NFC field confiner (FC) may be used as a medium to communicate between modules in a system, for example. The tapered coax NFC FC may have a central conductive element that is surrounded by a dielectric material selected to have a high permittivity or a high permeability in order for it to confine NFC energy by reducing the wavelength of the radiated energy.

A tapered coax NFC field confiner may also be constructed from a metamaterial. Metamaterials are smart materials engineered to have properties that have not yet been found in nature. They are made from assemblies of multiple elements fashioned from composite materials such as metals or plastics. The materials are usually arranged in repeating patterns, at scales that are smaller than the wavelengths of the phenomena they influence. Metamaterials derive their properties not from the properties of the base materials, but from their newly designed structures. Metamaterials may be designed to have a negative relative permittivity and/or a negative relative permeability. Such matamaterials may be referred to as "negative index materials." Metamaterials are now well known and need not be described further herein; see, e.g. "Metamaterials," Wikipedia, as of Dec. 2, 2015, which is incorporated by reference herein.

Using NFC coupling with a conductive reflector and a field confiner to distribute signals between various modules may provide a low cost interconnect solution. Embodiments of this disclosure provide a way to interface removable system modules without using physical/ohmic contacts.

FIG. 1 is a block diagram of an exemplary programmable logic controller 100 that uses guided NFC communication between modules. A programmable logic controller (PLC), or programmable controller, is a digital computer used for automation of typically industrial electromechanical processes, such as control of machinery on factory assembly lines, amusement rides, light fixtures, etc. PLCs are used in many machines, in many industries. PLCs are designed for multiple arrangements of digital and analog inputs and outputs, extended temperature ranges, immunity to electrical noise, and resistance to vibration and impact. Programs to control machine operation are typically stored in battery-backed-up or non-volatile memory. A PLC is an example of a "hard" real-time system since output results must be produced in response to input conditions within a limited time; otherwise, unintended operation may result. PLC systems are well known and need not be described in detail herein; e.g. see: "Programmable Logic Controller," Wikipedia, as of Dec. 1, 2015, which is incorporated by reference herein.

In this example, there are several modules that will be referred to as "line cards." Various types of line cards may be installed in a chassis or rack and configured for various purposes, such as: to control manufacturing processes, to control the heating and cooling in a building, to control medical equipment, etc. As such, electrical isolation is often needed or desirable to prevent ground loops or other interactions between various pieces of equipment that are being controlled. In the past, various types of isolation devices have been used, such as: optical isolators, transformers, etc.

In this example, there is a power supply line card 102, a data communication line card 110, and several processing line cards 120, 140, 141. While five line card modules are illustrated in FIG. 1, a typical chassis may accommodate ten or more modules. While a system using line cards is illustrated herein, embodiments of the disclosure are not limited to line cards. Various types of modules may make use of the communication techniques explained herein in order to provide reliable communication between removable modules.

In this example, supply line card 102 is coupled to a source of power and in-turn may produce one or more voltages that may be distributed via a bus 104 that may be coupled to each of the line cards via connectors such as connector 105. Typically, voltage bus(es) 104 may be included in a backplane that provides support for the connectors 105.

Data communication line card 110 may be configured to send and receive data via a communication channel to a remote host or another rack or chassis, for example. Various types of communication line card 110 may accommodate a wireless or wired interface. For example, an internet connection to a local or a wide area net may be provided by line card 110. Alternatively, a wireless connection to a Wi-Fi network or to a cellular network may be provided by line card 110.

Processing line card 120 may include, front end interface logic 130, processing logic 131, and aggregator logic 132, for example. Front end interface logic 130 may be of various types to provide interconnection to equipment that is being controlled, such as: input and output signals, RS232/422/485 compatible signals, digital signals, analog signals, etc. Various types of logic may be provided, such as: analog to digital converters (ADC), digital to analog converters (DAC), relays, contacts, etc. Processing logic 131 may include various types of hardwired and programmable logic, microcontrollers, microprocessors, memory, etc. Line cards 140, 141, etc may be identical or similar to line card 120 and may include various types and combinations of processing and interface logic as needed for a given control task.

In this example, each line card is configured to allow it to communicate with its nearest neighbor on both sides. For example, line card 110 may transmit via transmitter 111 to line card 120 which has a receiver 124. Similarly, line card 120 may transmit via transmitter 123 to receiver 115 on line card 110. At the same time, line card 120 may transmit via transmitter 122 to adjacent line card 140 and receive via receiver 121 from adjacent line card 140.

In a similar manner, each line card in system 100 may communicate with each other line card in a daisy chain manner. Each line card includes an aggregator/de-aggregator logic function, such as 132 on line card 120 that allows each line card to recognize communication on the daisy chain intended for it. The aggregator/de-aggregator function also allows a line card to originate a communication packet that is then provided to the daisy chain and then propagated through adjacent line cards to a final destination on a target line card. In this embodiment, the daisy chain operates in a similar manner to an internet network protocol and each aggregator 132 functions as an internet interface. In another embodiment, a different type of known or later developed peer to peer protocol may be used.

As mentioned above, NFC may be used as the transport vehicle to communicate between each adjacent line card. As will be described in more detail below, FC segments, such as FC 115, 225 and 116, 126 may be used to guide the NFC between each adjacent line card module in order to minimize signal spreading and interface to other systems and devices.

Figure 2:
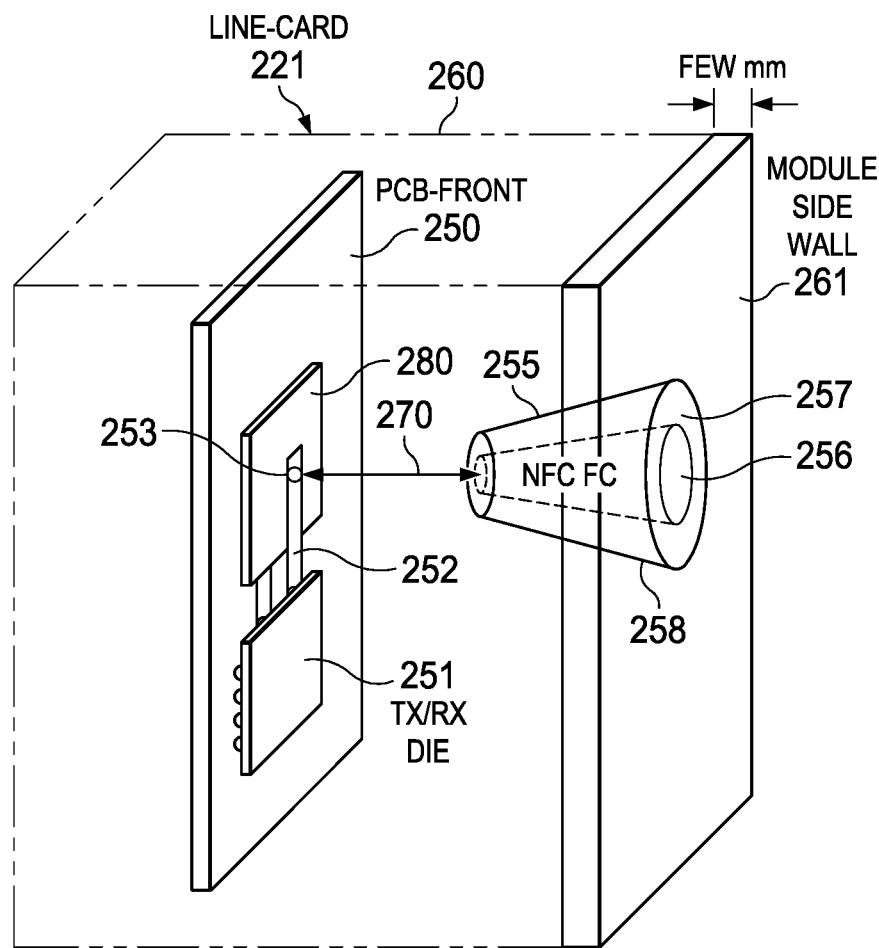
FIGS. 2-4 are more detailed illustrations of modules that include a tapered coax launch structure for the system of FIG. 1.
Figure 3:
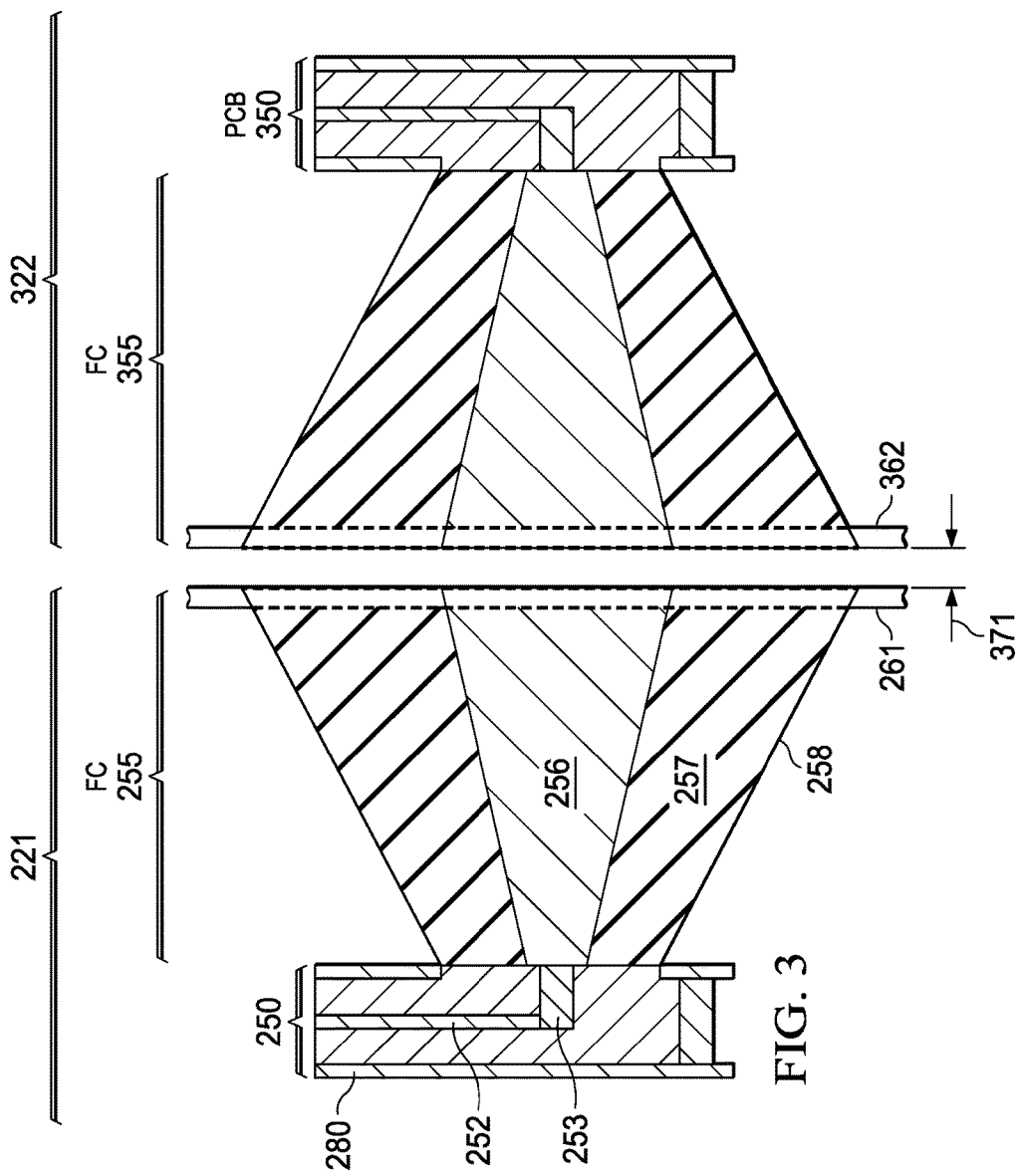
Figure 4:
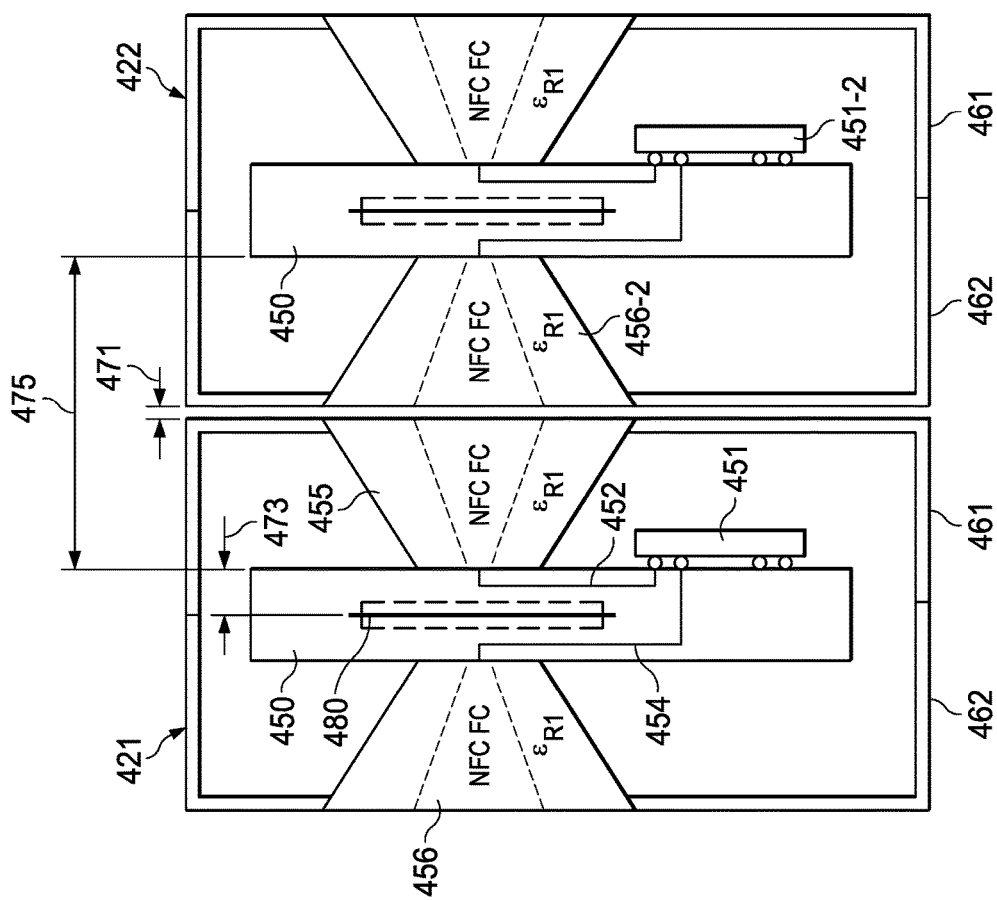

FIGS. 2-4 are more detailed illustrations of modules for the system of FIG. 1. FIG. 2 illustrates an example line card module 221 that is representative of the various modules 110, 120, 140, etc of system 100. Module 221 may include a substrate 250 on which are mounted various circuit components, such as an integrated circuit (IC) 251 that may include transmitter(s) and receivers(s), such as transmitter 123 and receiver 124 and/or transmitter 122 and receiver 121, of line card 120 as shown in FIG. 1, for example. In some embodiments, there may be a separate IC for each transmitter and receiver. In another embodiment, one or more receivers and transmitters may be formed in a single IC, for example. Embodiments of the disclosure may operate in near field mode in which the separation between adjacent modules is a fraction of the wavelength of the frequency being transmitted by the transmitter(s) in IC 251. For example, transmission frequencies in a range of 10 GHz to 30 GHz may be used. However, some embodiments may use frequencies that are higher or lower than this range, such as 5-100 GHz.

Integrated circuit 251 may also include aggregation logic, processing logic and front end logic, or there may be additional ICs mounted on substrate 250 that contain aggregation logic, processing logic, and front end logic. Substrate 250 may be a single or a multilayer printed circuit board, for example. IC 251 and other ICs may be mounted on substrate 250 using through hole or surface mount technology using solder bumps or bonding depending on the frequency of operation, or other known or later developed packaging technologies. Substrate 250 may be any commonly used or later developed material used for electronic systems and packages, such as: fiberglass, plastic, silicon, ceramic, acrylic, etc., for example.

Near field mode may produce an evanescent field that may be used to couple two adjacent NFC devices. Evanescent fields by nature exhibit an exponential decay with distance away from surface. By virtue of near proximity between NFC FC 255 and another NFC FC in an adjacent module that is only a few mm's away, a reasonable TX-to-RX signal coupling may be achieved using the evanescent field in near field mode while mitigating emission limits/concerns outlined per FCC Part 15.

The best analogy would be that of a transformer. A strong self-coupling between coils results in reduced leakage to the external world. Furthermore, any leakage may be considered un-intentional. The requirements for un-intentional radiation per FCC is greatly relaxed compared to those for intentional emissions.

Module 221 may be enclosed in a housing that is roughly indicated at 260. One side of the housing is illustrated as panel 261, which may be metal or plastic, for example. Typically, the housing will be a few mm thick.

NFC field confiner 255 may be mounted to panel 261 in a position that places it approximately centered over and adjacent contact bump 253 when housing 260 is assembled, as indicated by motion vector 270. Contact bump 253 is located at the end of strip line 252 that is connected to an output of the transmitter circuitry (or an input of the receiver circuitry) within IC 251. Field confiner 255 is essentially a short segment of tapered coaxial transmission line and includes a conductive center element 256 surrounded by a dielectric layer 257 and a conductive outer layer 258. When housing 260 is assembled, contact bump 253 will be in contact with a bottom surface of conductive element 256 of field confiner 255, as indicated by vector 270. In another embodiment, NFC FC 255 may be initially mounted on substrate 250 with center element 256 in contact with strip line 252 and be configured to span between substrate 250 and side panel 261 when housing 260 is assembled. In this manner, a majority of the RF signal that is produced by transmitter circuitry in IC 251 will be captured and confined by field confiner 255 and thereby directed to an adjacent module with minimal external radiation and signal loss.

Field confiner 255 may reduce radiation leakage and thereby contribute to FCC (Federal Communication Commission) compliance. Operation in the 5-100 GHz region produces cm/mm-wave frequencies that allow for relaxed spatial alignment tolerance between NFC field confiner 255 in module 260 and an adjacent NFC FC in an adjacent module.

A conductive reflector surface 280 may be positioned behind the strip line 252 to redirect a back scatter field to the desired direction of propagation through NFC FC 255.

Depending on the material and thickness of module wall 261, field confiner 255 may be simply mounted to or positioned adjacent the inside surface of module wall 261 such that the radiated signal passes through module wall 261. In some embodiments, a window may be provided in module wall 261 so that an outer surface of field confiner 255 may be mounted flush, slightly indented, or slightly proud of an outside surface of module wall 261, for example. The general location on the surface of the housing where the field confiner is located will be referred to herein as a "port."

FIG. 3 illustrates a cross-sectional view of a portion of a second module 322 that may be located adjacent module 221. Module 322 may have a housing that includes a panel 362, that will be referred to as a "left" panel. Module 221 may have a panel 261 that will be referred to as a "right" panel. Module 322 may include a substrate 350 that holds various ICs that may include a receiver and transmitter. Module 322 may also include a tapered coax field confiner 355 that is mounted to or adjacent to left panel 362.

When module 221 and module 322 are installed in a chassis, right panel 261 will be in close proximity to left panel 362, as indicated at 371. Field confiner 255 of module 221 and field confiner 355 of module 322 are configured so that they are in approximate alignment with each other. In this manner, a signal that is generated by a transmitter in IC 251 may be conducted to contact bump 253, conducted through conductive element 256 in field confiner 255. An electromagnetic emanated from the end of tapered NFC FC 255 is thereby directed to field confiner 356 which may then generate a resultant RF signal that may be provided to a receiver on substrate 350.

Module 221 or 322 may be easily removed from or inserted into a chassis without any wear and tear on contacts that were previously required to communicate signals between modules. Furthermore, dielectric field confiners 255, 356 provide complete electrical isolation between module 221 and module 322. An additional isolation mechanism is not required.

In this example, each NFC FC 255, 355 may have a generally round cross section; however, in other embodiments other shapes may be used, such as oval, square, rectangular, etc. The diameter of the inner conductive member 256 and outer conductive layer 258 is larger at the end that is adjacent right panel 261 than at the opposite end that is in contact with contact bump 253. FC 355 tapers similarly from substrate 350 to left panel 362. The characteristic impedance of a coaxial transmission line is proportional to the ratio of the inside diameter of outside layer 258 and the diameter of the outside surface in inner element 256. Thus, as the diameter of FC 255 increases towards right panel 261, the characteristic impedance increases. This in turn increases the ratio of the electric field to the magnetic field (E/H). For example, FC 255 may be configured to have a characteristic impedance of approximately 50 ohms at the end in contact with contact bump 253 to match the characteristic impedance of strip line 252, and to have a characteristic impedance matched to air (377 ohms) at the opposite end where it is adjacent to right panel 261. Having higher impedance at the interface between FC 255 and FC 355 will increase the near field coupling between FC 255 and FC 355. While a characteristic impedance of 377 ohms adjacent the right panel may be optimum, other embodiments may be configured to provide an impedance that is less than 377 ohms but greater than 50 ohms. An impedance close to that of air may be preferred, but is not critical. A wide range of impedance is acceptable; higher values closer to 377 ohms may provide slightly better coupling between modules.

The inner conductive element 256 and the conductive layer 258 may be fabricated with a metallic or non-metallic conductive material, such as: metal (copper, silver, gold, etc.), a conductive polymer formed by ionic doping, carbon and graphite based compounds, conductive oxides, etc. Common dielectric materials that may be used for dielectric layer 257 may have a relative permittivity ($\vartheta_R$) of approximately 2-3, for example. In some embodiments, dielectric region 257 may be air or a porous material filled with air.

NFC FC 255, (and similarly NFC FC 355) may be fabricated as a separate component and then mounted to either sidewall 261 or to substrate 250, for example. NFC FC 255 may be fabricated from separate molded or stamped parts that are then assembled together. In another embodiment, NFC FC 255 may be fabricated using three dimensional (3D) printing using conductive and non-conductive source materials to form a complete assembly. In some embodiments, NFC FC 255 may be 3D printed directly on side wall 261 or directly on substrate 250.

FIG. 4 is a more detailed illustration of two modules 421, 422 that are similar to modules 221, 322 of FIG. 3. This view is representative of a cross sectional view of the modules looking towards the backplane. In this example, modules 421, 422 are packaged in plastic housings that each may be formed as two "clam shells" as indicated at 461, 462. While two package elements are illustrated here, other embodiments may be assembled using various configurations of packaging that may have more than two parts, for example.

Each module may have one, or more, substrates, such as substrate 450. In this example, substrate 450 is a multilayer printed wiring board (PWB); however, other embodiments may use two PWBs mounted back to back, for example. One or more ICs 451 are mounted on substrate 450 and contain the transmitter and receiver, as described above in more detail. Processing logic and aggregator logic may also be included in the one or more ICs 451. A left NFC FC 456 may be coupled to a receiver in IC 451 via a stripline 454 formed on one or more layers of substrate 450. Similarly, right NFC FC 455 may be coupled to transmitter in IC 451 via a stripline 452 formed on one or more layers of substrate 450.

A shield 480 may be provided between left NFC FC 456 and right NFC FC 455 to minimize "back scatter" of the field produced by striplines 452, 454. Shield 480 may be connected to a ground reference for the module.

When module 421 and module 422 are placed adjacent to each other, the NFC port of module 421 formed by FC 455 and the NFC port of module 422 formed by NFC coupler 456-2 will form an electro-magnetic (EM) coupling that allows a signal generated by a transmitter in IC 451 to be EM coupled from NFC FC 455 to NFC FC 456-2 and then provided to a receiver in IC 451-2. A similar process may be used to transmit a signal from a transmitter in IC 451-2 to a receiver in IC 451 by using a second set of NFC FCs or by sharing NFC FCs 455, 456-2.

In this example, the FCs protrude through an opening in the housing wall and the outside surface edge of FC 455 and 457 are flush with the outside surface of the housing, such that the gap 471 between housings of module 421 and 422 determines the gap between FC 455 and 456-2. Minimizing the gap will minimize the amount of radiated energy the escapes while crossing the gap.

In another embodiment of a module 421, NFC field confiner 455 may be configured to stop at the inside surface of module housing panel 461. In this case, the dielectric characteristics of housing panel 461 may be chosen to be approximately equal to the dielectric characteristics of NFC field confiner 456, for example.

Alternatively, the outside surface of the NFC field confiners may stand proud of the outside surface of the housing panel. In this manner, the gap between adjacent NFC field confiners may be reduced.

In another embodiment, a flexible, non-conducting layer may be added to one or both surfaces of adjoining NFC field confiners of modules in order to fill the gap between modules. An example of a rubbery material with dielectric constant 2.5 to 3.5 is Silicone. Other materials with similar characteristics that may be used fall into two types: unsaturated rubber and saturated rubber.

Unsaturated rubbers include: Synthetic polyisoprene, Polybutadiene, Chloroprene rubber, Butyl rubber, Halogenated butyl rubbers, Styrene-butadiene Rubber, Nitrile rubber, Hydrogenated Nitrile Rubbers, etc, for example.

Saturated rubbers include: EPM (ethylene propylene rubber), EPDM rubber (ethylene propylene diene rubber), Epichlorohydrin rubber (ECO), Polyacrylic rubber (ACM, ABR), Silicone rubber (SI, Q, VMQ), Fluorosilicone Rubber (FVMQ), Fluoroelastomers (FKM, and FEPM) fluoro rubber, fluorocarbon rubber, Perfluoroelastomers (FFKM), Polyether block amides (PEBA), Chlorosulfonated polyethylene synthetic rubber (CSM), Ethylene-vinyl acetate (EVA), etc, for example.

Figure 5:
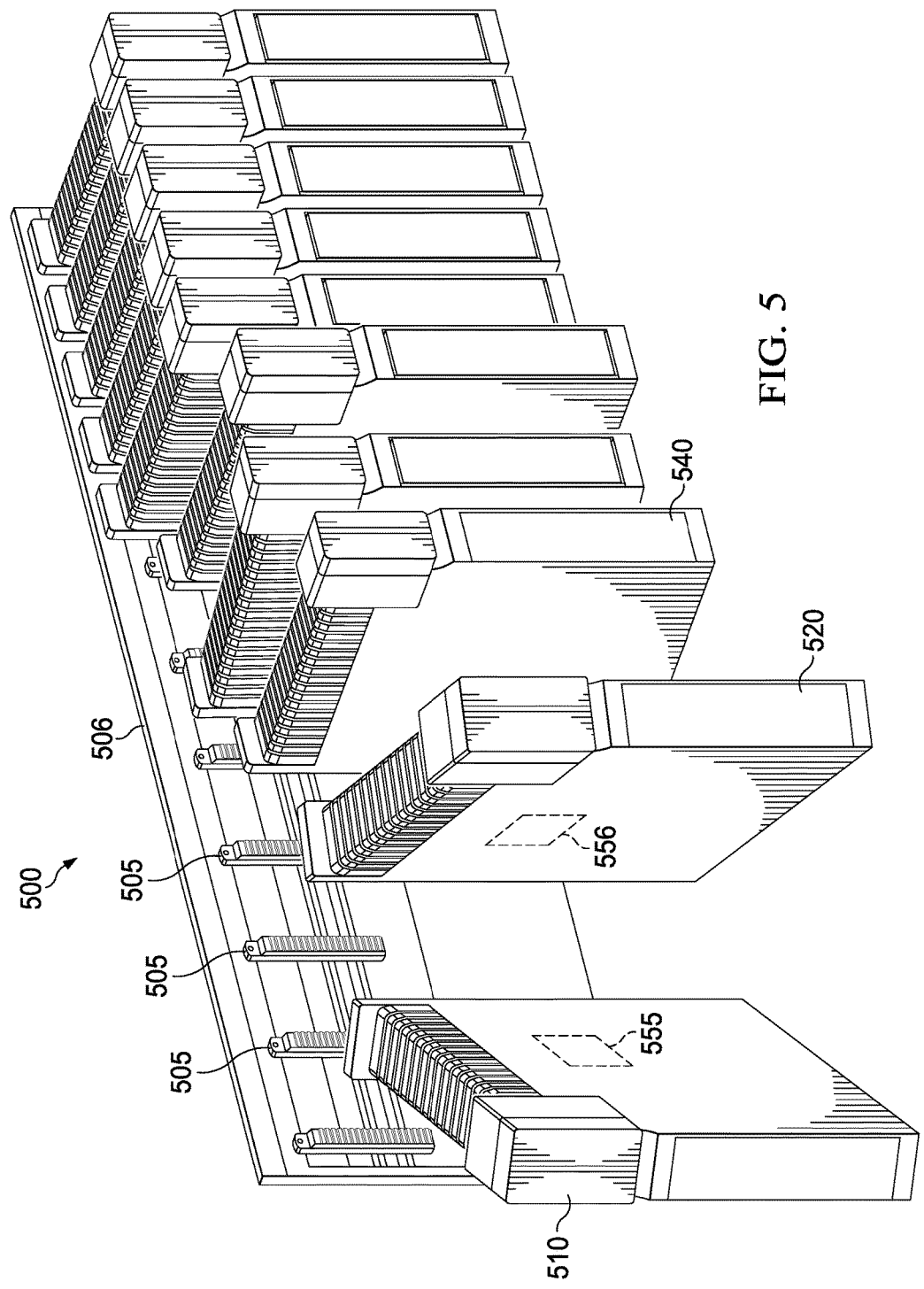
FIG. 5 is a pictorial illustration of the exemplary system of FIG. 1.

FIG. 5 is a pictorial illustration of an exemplary system 500 that is another view of system 100 of FIG. 1. Backplane 506 provides a set of connectors 505 for providing power to each line card, as explained with regard to connector 105 of FIG. 1. As can be seen by the illustration, each line card module is removable from backplane 506 by simply pulling the module to disconnect it from connector 505. Typically, a rack or chassis will also be provided along with backplane 506 to support the line cards when they are inserted into connectors 505.

Each line card module is enclosed in a housing, which may be made from plastic or other suitable materials. As described in more detail above, each line card may have a NFC coupler and tapered coaxial field confiner arranged to form a contactless communication port on each side of the module. For example, module 510 may have a port 555 on the right side of the module while module 520 may have a port 556 on the left side of the module that aligns with port 555 when both modules are plugged into backplane 506.

Similarly, module 520 may have another port (not shown) on the right side of the module while module 540 may have a port (not shown) on the left side of the module that aligns when both modules are plugged into backplane 506. All of the modules may have similar pairs of ports on both sides of each module to allow daisy chained communication among all of the modules, as described in more detail above.

Figure 6:
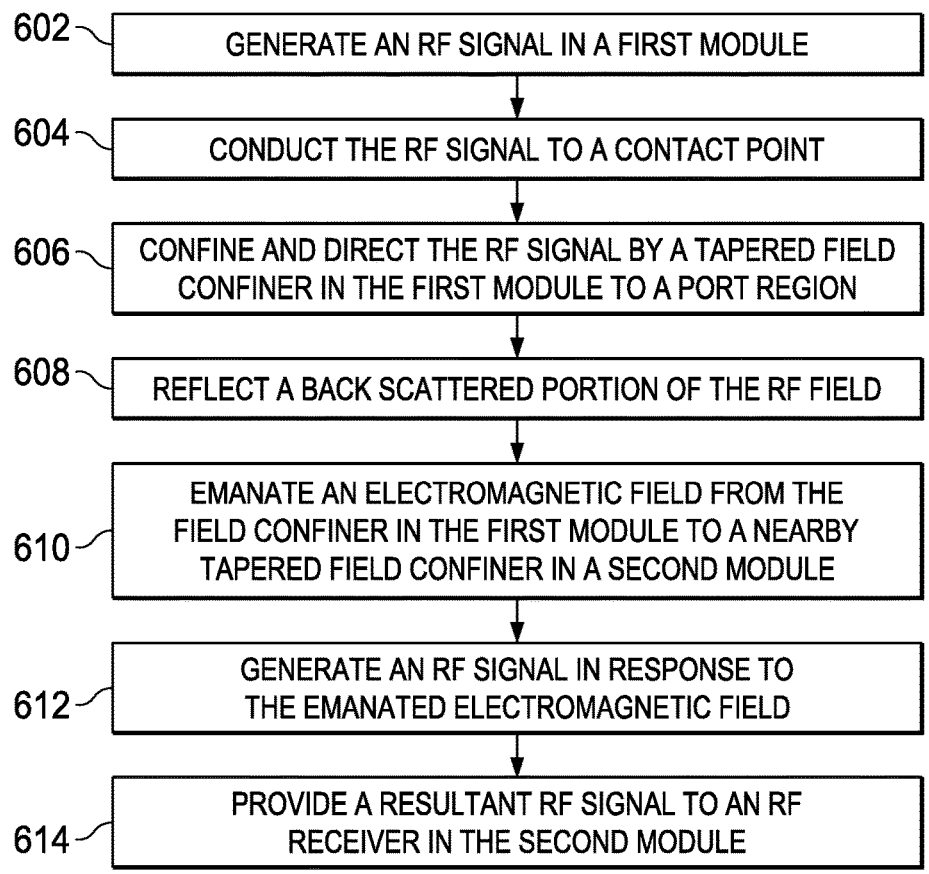
FIG. 6 is a flow chart illustrating operation of NFC between adjacent modules.

FIG. 6 is a flow chart illustrating operation of near field communication between modules, as described above in more detail. As described above in more detail, the modules may be part of a programmable logic control system used for industrial, commercial, and residential applications. A typical system may include a rack or chassis into which a set of modules are installed. Each module may communicate with an adjacent neighbor module using near field communication, in which an RF signal generated in one module may be EM coupled to a receiver in an adjacent module using radiative coupling, near field coupling, or evanescent coupling, or any combination of these modes.

For example, a radio frequency (RF) signal may be generated in a first module as indicated in block 602. In the example of FIGS. 1-7, the RF signal may have a frequency in the range of 10-30 GHz. However, other systems may use RF signals at a higher or lower frequency by adjusting the physical size of the field coupling and field confining components described herein.

The RF signal may be conducted to a contact point using a stripline or microstrip transmission line, such as stripline 252 in FIG. 2-3 for example, as indicated in block 604.

The RF signal may then be conducted from the contact point to a port region in the module using a tapered near field communication (NFC) field confiner as indicated in block 606. The NFC field confiner may be similar to field confiner 255 in FIGS. 2-3, for example. The field confiner is essentially a short segment of tapered coaxial transmission line and includes a conductive center element surrounded by a dielectric layer and a conductive outer layer. As described above in more detail, the field confiner is tapered and has a first characteristic impedance value near the contact point and a second higher characteristic impedance value at the port region. Having higher impedance at the port region interface between field confiners in adjacent modules will increase the near field coupling between the adjacent field confiners.

A portion of the RF signal may radiate in a backscatter fashion. A conductive reflector may be placed behind the NFC field confiner to reflect a portion of the backscatter energy, as indicated at block 608.

An RF electromagnetic field may be emanated in response to the RF signal from the end of the NFC field confiner in the port region of the first module as indicated in block 610. The emanated RF electromagnetic field may then coupled to a second tapered NFC field confiner in the second module is indicated in block 610. As described above in more detail, this coupling is performed by EM coupling and may use the near field of the emanated electromagnetic field. This coupling may also make use of radiated energy that is propagated from the first NFC field confiner to the second NFC field confiner. The coupling may also make use of an evanescent field that is formed by the first NFC field confiner. Depending on the spacing between the adjacent modules, one or a combination of these coupling modes may occur to generate an RF signal, as indicated in block 612.

A resultant RF signal may then be provided to an RF receiver on the second module as shown in block 614. As described above in more detail, the multiple modules in the system may communicate in a daisy chained manner such that any module may be able to communicate with any other module in the system.

A known standard communication protocol, such as the Internet Protocol (IP) may be used, treating the daisy chained NFC physical media as an Ethernet. The Internet Protocol (IP) is the principal communications protocol in the Internet protocol suite for relaying datagrams across network boundaries. IP has the task of delivering packets from the source host to the destination host solely based on the IP addresses in the packet headers. For this purpose, IP defines packet structures that encapsulate the data to be delivered. It also defines addressing methods that are used to label the datagram with source and destination information. The first major version of IP, Internet Protocol Version 4 (IPv4), is the dominant protocol of the Internet. Its successor is Internet Protocol Version 6 (IPv6).

Another embodiment may use another known or later developed communication protocol for communication using the daisy chained NFC physical media as described herein.

In this manner, embodiments of the present disclosure may provide high throughput communication between removable modules of a system using near field communication techniques. The techniques described herein may be less expensive than alternatives such as optical couplers, for example. NFC allows contactless communication between modules and thereby eliminates the need for additional isolation in systems that may require isolation between modules.

Other Embodiments

While the disclosure has been described with reference to illustrative embodiments, this description is not intended to be construed in a limiting sense. Various other embodiments of the disclosure will be apparent to persons skilled in the art upon reference to this description. For example, while a programmable logic controller system was described, other types of modular systems may embody aspects of the present disclosure in order to improve reliability.

While an NFC FC in the form of a tapered coaxial conductive transmission line that is mounted perpendicular to a substrate is disclosed herein, in other embodiments the NFC FC may be configured and mounted in skewed manner such that two or more NFC FCs may be mounted on opposite sides of the substrate and still couple to port regions that align with port regions in adjacent modules. In this case, the contact bump on the substrate may be offset from the port region on the surface of the module.

While modules in which the guided NFC ports are located on the side of the module were described herein, in another embodiment a port may be located on an edge of a module with a mating port located on a backplane or other surface that is adjacent to the edge of the module, for example.

While modules enclosed in a housing were disclosed herein, in other embodiments a housing may be omitted. In some embodiments, the module may be enclosed in mold compound, for example.

While a daisy-chained communication configuration was described herein, in another embodiment other topologies may be formed. For example, a tree topology may be formed by providing a port on the backplane that mates with an edge mounted port in each module.

A dielectric or metamaterial tapered field confiner may be fabricated onto a surface of a substrate or module panel using a 3D printing process, for example.

While field confiners with a polymer dielectric layer have been described herein, other embodiments may use other materials for the dielectric layer, such as ceramics, glass, etc., for example.

While a tapered coaxial field confiner with a round cross section is described herein, other embodiments may be easily implemented. For example, the field confiner may have a cross section that is rectangular, trapezoidal, cylindrical, oval, or other selected geometries.

The dielectric layer of the tapered FC may be selected from a range of approximately 2.4-12, for example. These values are for commonly available polymer dielectric materials. Dielectric materials having higher or lower values may be used when they become available.

While sub-terahertz signals in the range of 10-30 GHz were discussed herein, tapered NFC FCs and systems for distributing higher or lower frequency signals may be implemented using the principles described herein by adjusting the physical size of the field confiner accordingly. For examples, signals in the range of 5-100 Ghz may be used with appropriate sizing of the tapered NFC FC.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the disclosure should not be considered limited to the specific ordering of steps shown in the figures and/or described herein.

It is therefore contemplated that the appended claims will cover any such modifications of the embodiments as fall within the true scope and spirit of the disclosure.

What is claimed is:

1. A system comprising:
    a module comprising: a substrate on which a radio frequency (RF) transmitter is mounted, the RF transmitter having an output terminal; a housing having a port region at a surface of the housing; and a tapered transmission line with a conductive element, the conductive element having a first end coupled to the output terminal of the RF transmitter and a second end that terminates at the port region, wherein a characteristic impedance of the tapered transmission line increases along a length of the tapered transmission line from the first end to the second end, and the tapered transmission line has an outside surface separated from the conductive element by a dielectric, in which the dielectric is air.

2. A system comprising:
    a module comprising: a substrate on which a radio frequency (RF) transmitter is mounted, the RF transmitter having an output terminal; a housing having a port region at a surface of the housing; and a tapered transmission line with a conductive element, the conductive element having a first end coupled to the output terminal of the RF transmitter and a second end that terminates at the port region, wherein a characteristic impedance of the tapered transmission line increases along a length of the tapered transmission line from the first end to the second end, and the tapered transmission line has an outside surface separated from the conductive element by a dielectric, in which the outside surface is conductive and coupled to a ground reference of the substrate.

3. The system of claim 1, wherein an axis along the length of the tapered transmission line is perpendicular to the substrate.

4. A system comprising:
    a module comprising: a substrate on which a radio frequency (RF) transmitter and an RF receiver are mounted, the RF transmitter having an output terminal, and the RF receiver having an input terminal; a housing having first and second port regions at a surface of the housing; a first tapered transmission line with a first conductive element the first conductive element having a first end coupled to the output terminal of the RF transmitter and a second end that terminates at the first port region, wherein a characteristic impedance of the first tapered transmission line increases along a length of the first tapered transmission line from the first end to the second end, and the first tapered transmission line has an outside surface separated from the first conductive element by a first dielectric; and a second tapered transmission line with a second conductive element, the second conductive element having a third end coupled to the input terminal of the RF receiver and a fourth end that terminates at the second port region, wherein a characteristic impedance of the second tapered transmission line increases along a length of the second tapered transmission line from the third end to the fourth end, and the second tapered transmission line has an outside surface separated from the second conductive element by a second dielectric.

5. A system comprising:
    a first module comprising: a substrate on which a radio frequency (RF) transmitter is mounted, the RF transmitter having an output terminal; a housing having a first port region at a surface of the housing; and a tapered transmission line with a conductive element the conductive element having a first end coupled to the output terminal of the RF transmitter and a second end that terminates at the first port region, wherein a characteristic impedance of the tapered transmission line increases along a length of the tapered transmission line from the first end to the second end, and the tapered transmission line has an outside surface separated from the conductive element by a dielectric; and a backplane with first and second locations for attaching the first module and a second module, respectively, so the first port region aligns with a second port region of the second module when the first and second modules are attached to the backplane.

6. The system of claim 1, wherein the tapered transmission line fills a gap between the port region and the substrate.

7. A system comprising:
a module comprising: a substrate on which a radio frequency (RF) transmitter is mounted, the RF transmitter having an output terminal; a housing having a port region at a surface of the housing; and a tapered transmission line with a conductive element the conductive element having a first end coupled to the output terminal of the RF transmitter and a second end that terminates at the port region, wherein a characteristic impedance of the tapered transmission line increases along a length of the tapered transmission line from the first end to the second end, and the tapered transmission line has an outside surface separated from the conductive element by a dielectric, and the first end is coupled to a contact bump on the substrate, and the contact bump is offset laterally from the port region, and the tapered transmission line is skewed to fill a gap between the port region and the contact bump.

8. The system of claim 1, wherein an electromagnetic field emanated from the tapered transmission line has a frequency in a range of 5-100 GHz.

9. A method of transmitting a signal in a system, the method comprising:
generating a first radio frequency (RF) signal in a module;
generating a second RF signal in the module;
conducting the first RF signal through a first signal line to a first contact point;
conducting the second RF signal through a second signal line to a second contact point;
confining and directing the first RF signal by a first tapered near field communication (NFC) field confiner from the first contact point to a first port region of the module, wherein the first tapered NFC field confiner has a first characteristic impedance value at the first contact point and a second characteristic impedance value at the first port region;
confining and directing the second RF signal by a second tapered NFC field confiner from the second contact point to a second port region of the module, wherein the second tapered NFC field confiner has a third characteristic impedance value at the second contact point and a fourth characteristic impedance value at the second port region;
emanating a first RF electromagnetic field in response to the first RF signal from the first port region of the module; and
emanating a second RF electromagnetic field in response to the second RF signal from the second port region of the module.

10. The method of claim 9, wherein the module is a first module and the method further comprises:
receiving the emanated first RF electromagnetic field at a third port region of a second module adjacent the first module;
confining and directing a resultant RF signal by a third tapered NFC field confiner from the third port region to a third contact point, wherein the third tapered NFC field confiner has a fifth characteristic impedance value at the third contact point and a sixth characteristic impedance value at the third port region; and
providing the resultant RF signal to an RF receiver of the second module.

11. The system of claim 1, wherein the tapered transmission line is a tapered near field communication (NFC) field confiner.

12. The system of claim 2, wherein the tapered transmission line is a tapered near field communication (NFC) field confiner.

13. The system of claim 2, wherein an axis along the length of the tapered transmission line is perpendicular to the substrate.

14. The system of claim 2, wherein the tapered transmission line fills a gap between the port region and the substrate.

15. The system of claim 2, wherein an electromagnetic field emanated from the tapered transmission line has a frequency in a range of 5-100 GHz.

16. The system of claim 4, wherein the first and second tapered transmission lines are tapered near field communication (NFC) field confiners.

17. The system of claim 4, wherein a first axis along the length of the first tapered transmission line is perpendicular to the substrate, and a second axis along the length of the second tapered transmission line is perpendicular to the substrate.

18. The system of claim 4, wherein the first tapered transmission line fills a first gap between the first port region and the substrate, and the second tapered transmission line fills a second gap between the second port region and the substrate.

19. The system of claim 4, wherein an electromagnetic field emanated from the first tapered transmission line has a frequency in a range of 5-100 GHz.

20. The system of claim 5, wherein the tapered transmission line is a tapered near field communication (NFC) field confiner.

21. The system of claim 5, wherein an axis along the length of the tapered transmission line is perpendicular to the substrate.

22. The system of claim 5, wherein the tapered transmission line fills a gap between the first port region and the substrate.

23. The system of claim 5, wherein an electromagnetic field emanated from the tapered transmission line has a frequency in a range of 5-100 GHz.

24. The system of claim 7, wherein the tapered transmission line is a tapered near field communication (NFC) field confiner.

25. The system of claim 7, wherein an axis along the length of the tapered transmission line is perpendicular to the substrate.

26. The system of claim 7, wherein the tapered transmission line fills a gap between the port region and the substrate.

27. The system of claim 7, wherein an electromagnetic field emanated from the tapered transmission line has a frequency in a range of 5-100 GHz.

* * * * *